F. C. FEIKER.
PNEUMATIC TIRE.
APPLICATION FILED APR. 1, 1912.
1,075,345.
Patented Oct. 14, 1913.
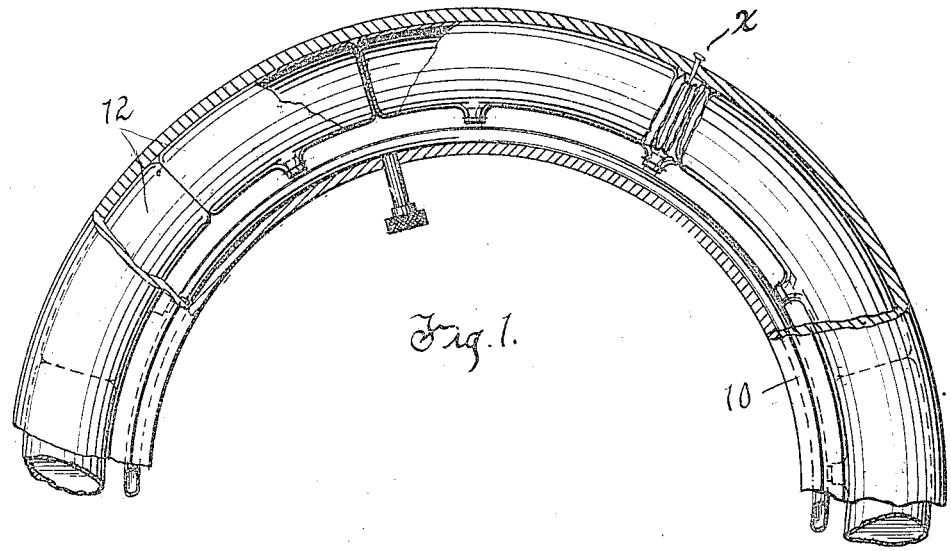
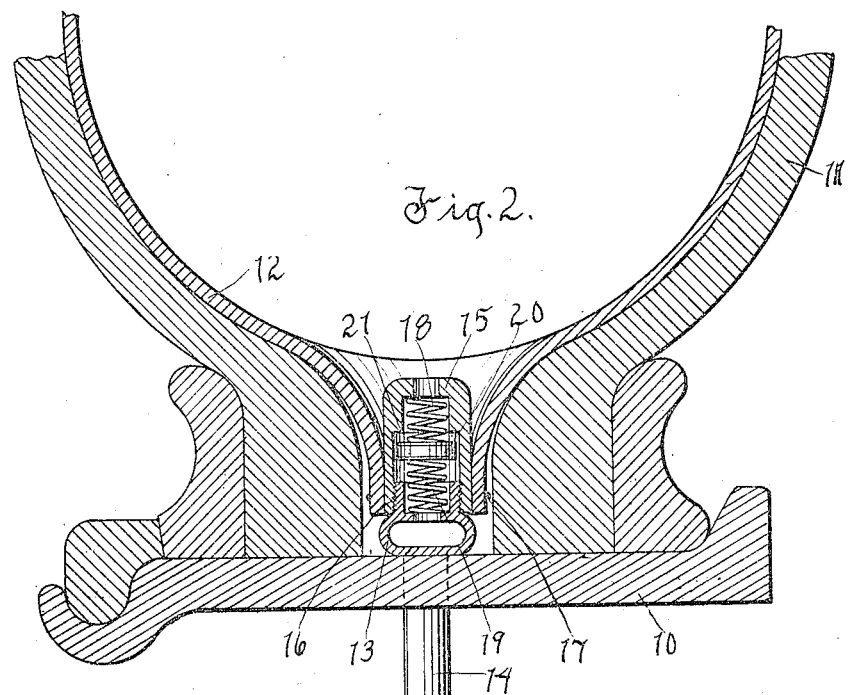

UNITED STATES PATENT OFFICE.

FREDRICK C. FEIKER, OF RACINE, WISCONSIN.

PNEUMATIC TIRE.

1,075,345.

Specification of Letters Patent.

Patented Oct. 14, 1913.

Application filed April 1, 1912. Serial No. 687,805.

*To all whom it may concern:*

Be it known that I, FREDRICK C. FEIKER, a citizen of the United States, and resident of Racine, in the county of Racine and State of Wisconsin, have invented new and useful Improvements in Pneumatic Tires, of which the following is a description, reference being had to the accompanying drawings, which are a part of this specification.

This invention relates to pneumatic tires designed for use on vehicles and the like and has for its object to provide a tire of a cellular inner structure which in event of puncture will not be entirely disabled but will only have the affected cell collapsed while the adjoining cells expand to take its place.

Another object of the invention is to provide such a cellular tire with a common means for inflating the several cells thereof and with valve mechanism which will automatically close to prevent the loss of air by uninjured cells upon the occurrence of an accident.

With the above and other objects in view the invention consists in the pneumatic tire as herein claimed and all equivalents.

Referring to the accompanying drawings in which like characters of reference indicate the same parts in the different views: Figure 1 is a sectional elevation of a portion of a pneumatic tire constructed in accordance with this invention; and, Fig. 2 is a transverse sectional view of a portion thereof.

In these drawings 10 indicates the rim of a vehicle wheel and 11 is the outer casing of the tire, both of which may be of any desirable construction. Instead of having a single inner tube as usual, the present invention provides a series of independent air bags or rubber cells 12 each provided with a valve connection with a metal air tube 13 which is contained in the space between the rim and the air cells and has a valved pump connection 14 passing through the rim 10 as with the ordinary pneumatic tire. The valve connection for each air cell comprises a casing 15 which is contained within the contracted neck portion of the rubber air bag 12 and is threaded upon a nipple 16 of the metal air tube 13, the neck of the rubber air cell 12 having a binding wire 17 surrounding it to effect an air tight connection with the valve casing 15. The valve casing contains a pair of coil springs 18 and 19 respectively bearing on opposite sides of a valve member 20 which is normally held in the position shown in Fig. 2 by said springs but is capable of seating on a valve seat 21 above it formed by a shoulder of the casing when the rubber air cell to which it is attached is suddenly deflated as upon receiving a puncture or which may be seated upon the end of the nipple 16 below it in the event of a sudden reduction in air pressure in the air tube 13 from any cause.

In practice the air cells in a partially inflated state may be assembled within the outer casing 11 and when said casing is clamped in place on the rim the tire may be inflated by connecting the valve nipple 14 with an air pump. The compressed air in the air tube 13 passes through the valve connections of the several air cells 12 causing them to expand and fill the outer casing to the desired extent, the valves remaining suspended by the action of the opposed springs 18 and 19 during the gradually produced inflation. In the event of a puncture as at X in Fig. 1 only the air cell which is ruptured is affected as the adjacent air cells are sufficiently flexible to expand and fill in the space formerly occupied by the injured air cell, thus completing the regular contour of the tire and such expansion does not produce any irregularity in the shape of the tire for the valve connections of all the air cells with the air tubes causes the air pressure in them to be equalized. When one of the air cells 12 is punctured and collapses the reduction of pressure therein permits pressure of air against the valve 20 of that air cell to close against its valve seat 21 and thus prevents the loss of air from the other air cells. Should the valve 20 of the ruptured air cell fail to close in this manner or from any other cause result in the reduction of pressure in the air tube 13 the valves 20 of the uninjured air cells will close against the valve seat 16 and so prevent the escape of air from the uninjured air cells.

With this invention an injured air cell may be readily replaced to restore the tire to its normal condition, but temporarily the tire automatically rights itself by the expansion of the adjacent air cells, making it unnecessary to effect repairs until convenient to do so.

What I claim as new and desire to secure by Letters Patent is:

1. A pneumatic tire, comprising an outer casing, a series of expansible air cells contained therein, an air tube, and double seated check valve connections between the air tube and the several air cells for closing the connection upon a material reduction of air pressure on either side thereof to prevent the exhaust of air pressure from the air tube to a punctured air cell or from an air cell to the air tube.

2. A pneumatic tire, comprising an outer casing, a series of rubber bags forming air cells within the outer casing, an air tube having a valved nipple air pump connection, threaded nipples on the air tube forming valve seats, valve casings threaded on the nipples and having valve seats, valves within the valve casings, springs on opposite sides of the valves for normally holding them off of their seats, said valve casings having connection with the several air cells and said valves being adapted for closing against one or the other of the valve seats upon a material reduction of air pressure on either side thereof to prevent the exhaust of air from the air tube to a punctured air cell or from an air cell to the air tube.

In testimony whereof, I affix my signature, in presence of two witnesses.

FREDRICK C. FEIKER.

Witnesses:
S. MIKULECKY,
W. J. JANDL.